(12) United States Patent
Snydmiller et al.

(10) Patent No.: US 9,656,894 B2
(45) Date of Patent: May 23, 2017

(54) WASTEWATER HYDROCARBON EXTRACTION AND ENVIRONMENTAL TREATMENT METHOD AND SYSTEM

(75) Inventors: Jason Snydmiller, Calgary (CA); Stuart Snydmiller, Chestermere (CA)

(73) Assignee: David Robinson, Calgary (CA)

( * ) Notice: Subject to any disclaimer, the term of this patent is extended or adjusted under 35 U.S.C. 154(b) by 1037 days.

(21) Appl. No.: 13/703,257

(22) PCT Filed: Jun. 10, 2011

(86) PCT No.: PCT/CA2011/000685
§ 371 (c)(1),
(2), (4) Date: Jul. 18, 2013

(87) PCT Pub. No.: WO2011/153630
PCT Pub. Date: Dec. 15, 2011

(65) Prior Publication Data
US 2013/0284677 A1    Oct. 31, 2013

Related U.S. Application Data

(60) Provisional application No. 61/353,270, filed on Jun. 10, 2010.

(51) Int. Cl.
*C02F 1/24* (2006.01)
*C02F 9/02* (2006.01)
(Continued)

(52) U.S. Cl.
CPC .............. *C02F 9/00* (2013.01); *C10G 33/04* (2013.01); *C10G 33/06* (2013.01); *C02F 1/048* (2013.01);
(Continued)

(58) Field of Classification Search
None
See application file for complete search history.

(56) References Cited

U.S. PATENT DOCUMENTS

| 3,338,414 A | * | 8/1967 | Lefke | E02B 15/10 |
|---|---|---|---|---|
| | | | | 210/179 |
| 3,426,902 A | * | 2/1969 | Bauer | E02B 15/103 |
| | | | | 210/179 |

(Continued)

FOREIGN PATENT DOCUMENTS

| WO | 03076344 A1 | 9/2003 |
|---|---|---|
| WO | 2006086384 A2 | 8/2006 |

OTHER PUBLICATIONS

"Conversion of Oilfield Produced Water Into an Irrigation?Drinking Quality Water", Tao F. T. et al., Society of Petroleum Engineers (SPE) 26003, p. 571-579, Mar. 1993.*
(Continued)

*Primary Examiner* — Thomas M Lithgow
(74) *Attorney, Agent, or Firm* — Blake, Cassels & Graydon LLP; Brett J. Slaney

(57) ABSTRACT

Method and system for extracting and recovering hydrocarbons from wastewater and treating the water to improve its condition. A series of specific unit operations result in the extraction of hydrocarbons, solids and contaminants and the treatment of water to a condition which is fit for re-use or environmentally sustainable discharge. Phase separation between the water and hydrocarbons is effected using flotation techniques followed by collection of the hydrocarbons using a movable collection surface. The aqueous phase is processed by multiple filtration steps. The result is significant extraction and recovery of hydrocarbons and conservation of water for re-use or discharge to the environment in a process which is continuous and scalable for large or small operations.

22 Claims, 5 Drawing Sheets

(51) Int. Cl.
*C02F 9/00* (2006.01)
*C10G 33/04* (2006.01)
*C10G 33/06* (2006.01)
*C02F 1/04* (2006.01)
*C02F 1/06* (2006.01)
*C02F 1/40* (2006.01)
*C02F 101/32* (2006.01)

(52) U.S. Cl.
CPC ........ *C02F 1/06* (2013.01); *C02F 1/24* (2013.01); *C02F 1/40* (2013.01); *C02F 2101/32* (2013.01); *C10G 2300/201* (2013.01); *C10G 2300/80* (2013.01)

(56) References Cited

U.S. PATENT DOCUMENTS

| | | | | |
|---|---|---|---|---|
| 4,231,867 A * | 11/1980 | Sutphin | ............ | B01D 17/0205 210/218 |
| 4,880,533 A | 11/1989 | Hondulas | | |
| 5,120,435 A * | 6/1992 | Fink | ............ | B01D 17/00 210/192 |
| 5,681,458 A * | 10/1997 | Favret | ............ | B01D 17/0202 210/221.2 |
| 6,106,711 A * | 8/2000 | Morse | ............ | B01D 17/0205 210/202 |
| 6,436,296 B1 * | 8/2002 | White | ............ | C02F 1/22 210/719 |
| 6,884,347 B1 | 4/2005 | Krieger | | |
| 7,520,993 B1 * | 4/2009 | Laraway | ............ | B01D 61/58 210/175 |
| 7,597,144 B2 * | 10/2009 | Minnich | ............ | B01D 17/02 166/266 |
| 8,173,025 B2 * | 5/2012 | Reidhead | ............ | B01D 1/20 159/3 |
| 2003/0168410 A1 * | 9/2003 | Robicheaux | ....... | B01D 17/0202 210/691 |
| 2003/0173288 A1 | 9/2003 | Arnaud | | |
| 2010/0294719 A1 * | 11/2010 | Polizzotti | ............ | C02F 9/00 210/654 |

OTHER PUBLICATIONS

Pysyk, Wendy; International Search Report from corresponding International application No. PCT/CA2011/000685; Search completed Aug. 18, 2011.

* cited by examiner

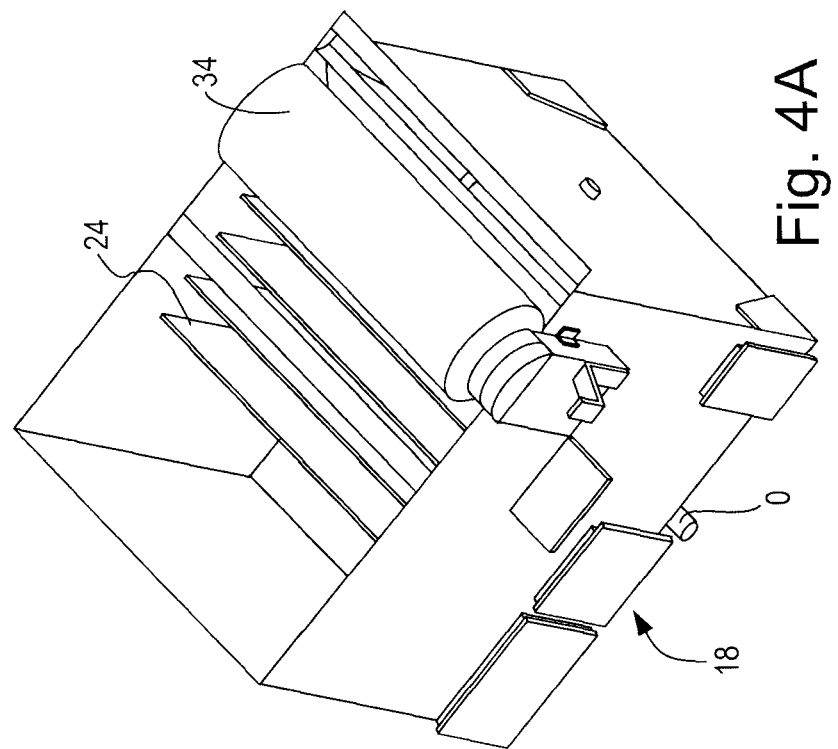
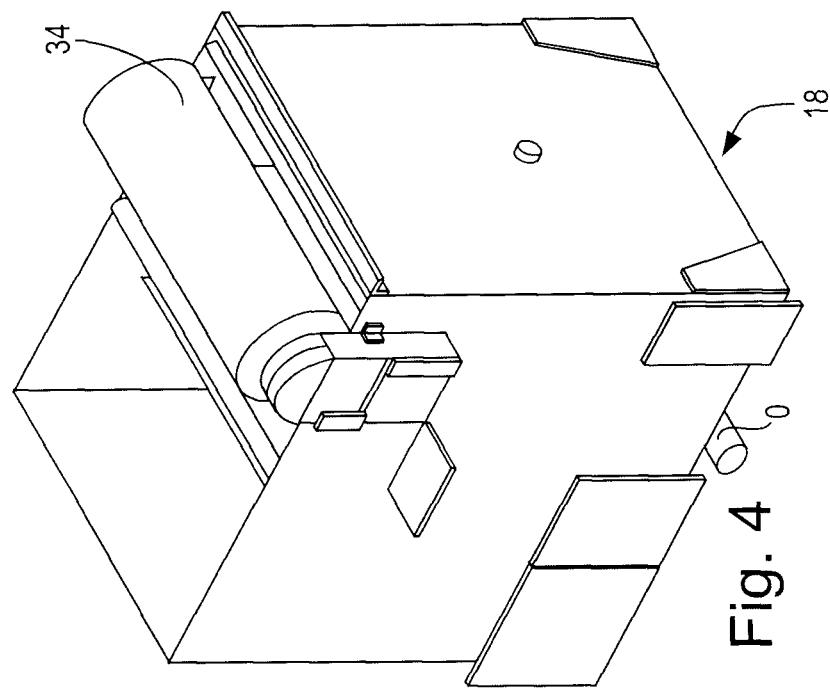

WASTEWATER HYDROCARBON EXTRACTION AND ENVIRONMENTAL TREATMENT METHOD AND SYSTEM

FIELD OF THE INVENTION

A scalable energy efficient method and system for processing wastewater to separate, extract and recover hydrocarbons and to filter and treat the associated water to enable; re-use for industrial purposes, or re-use for agricultural purposes or environmentally sustainable discharge.

BACKGROUND OF THE INVENTION

In the hydrocarbon extraction industry categories of contaminated water requiring treatment include surface wastewater; originating from precipitation and groundwater sources, produced water; recovered from underground with associated hydrocarbons, and process water; introduced during hydrocarbon production techniques. Hydrocarbon production techniques which use large quantities of water include; Cyclic Steam Stimulation (CSS) for heavy oil production, Steam Assisted Gravity Drainage (SAGD) for oilsand bitumen production, Water Flooding for conventional oil reservoir production and hydraulic fracturing for unconventional gas and oil production. These forms of wastewater typically include a number of individual components namely, water, hydrocarbons, suspended solids, and contaminants which include but are not limited to, dissolved solids, naturally occurring compounds and synthetic additives.

Current industrial practices include disposing of contaminated wastewater into deep underground disposal wells, impoundment and various treatment technologies. Compliance with increasingly stringent environmental regulations requires improved processes to separate and extract the hydrocarbons, solids and contaminants and process the water to a purity suitable for re-use for industrial purposes, or potentially to a significantly enhanced purity suitable for re-use for agricultural purposes or environmentally sustainable discharge.

Various surfactants, filters and chemical additives have been developed for extracting hydrocarbons from wastewater. One example is membrane bioreactors which have been also proposed for use in hydrocarbon removal from industrial wastewater. In the known arrangements, the reactors employ hollow fibre membranes. The reactors typically employ microfiltration hollow fibres which are submerged in the bioreactor.

In U.S. Pat. No. 6,521,125, there is disclosed an oil/hydrocarbon removal system. It is indicated in the disclosure that the system is useful for collecting the bilge of marine vessels which assists in ensuring that there is oil-free water in the surrounding water of the vessels. The filter in the medium is indicated to comprise a mixture of peat, anthracite and bentonite to produce a composition that is both hydrophobic and oleophilic.

In many instances, in the individual arrangements discussed above, the filter technology requires the replacement of the filter material which is eventually prone to plugging and general wear or reduced effectiveness. This presents difficulties in a remote location where accessibility of replacement parts is challenging, if not impossible. Further, many of the technologies are particularly effective as filters for removing the hydrocarbons, however, in many situations the water which must be discharged or otherwise handled is not properly decontaminated in compliance with stringent environmental restrictions.

Particularly in the case of produced water, there are typically high levels of dissolved solids and salts, and therefore desalination treatment may also be required prior to re-use or discharge.

Reverse osmosis membranes are the most prevalent desalination treatment for large volumes of water. However, even minimal levels of hydrocarbons in the input fluid stream will cause fouling, resulting in impaired functionality and deterioration or irreversible damage to the membranes. The presence of suspended solids and contaminants such as iron and calcium, cause scaling and deposits which impair functionality and require periodic cleaning with harsh chemicals, resulting in interrupted processing and a reduced membrane lifecycle.

Therefore, utilization of membrane filtration treatment processes such as reverse osmosis membranes for streams of fluid containing hydrocarbons, requires preliminary treatment to remove hydrocarbons, solids and scaling and deposit contaminants from the stream of fluid before it encounters the membrane. A prevalent preliminary treatment approach is ceramic membrane ultra-filtration. However, ceramic membranes require frequent backwash cleaning cycles to remove trapped hydrocarbons, solids and contaminants. Cleaning periodically interrupts processing. It also generates a backwash fluid waste stream which requires disposal. Costs include backwash fluid waste disposal services, a supply of hazardous cleaning chemicals and a dependency upon expensive consumable replacement membranes.

A need therefore exists, for a cost-effective preliminary treatment which enables effective utilisation of auxiliary treatment methods such as reverse osmosis membranes.

Surface wastewater generated in hydrocarbon extraction industry activities may become contaminated with drilling mud, hydrocarbons and chemicals. Current industry management practices include transportation and disposal into an injection well or use of a boiler to evaporate contaminated surface wastewater. Boiler evaporation is environmentally undesirable because the contaminants in untreated water are also discharged into the atmosphere. Additionally significant quantities of diesel fuel are consumed to heat the boiler, particularly during winter drilling activities when the volume of diesel fuel consumed may be equivalent to the volume of water to be evaporated.

There is therefore an increasing industrial need for effective, economically viable and environmentally sustainable processes for enabling the treatment, and re-use or discharge, of wastewater containing hydrocarbons, suspended solids, and contaminants which include but are not limited to dissolved solids, naturally occurring compounds and synthetic additives.

SUMMARY OF THE INVENTION

These and other needs are addressed by the present invention which is directed generally to extraction of hydrocarbons from a wastewater source. Valuable hydrocarbons can be recovered and wastewater can be re-used for industrial purposes, or re-used for agricultural purposes, or discharged to the environment.

In a first embodiment of the present invention, there is provided a method for extracting hydrocarbons from wastewater, comprising providing a source of wastewater comprising hydrocarbons, water, suspended solids and contaminants in a mixture; treating said wastewater to separate said hydrocarbons from said wastewater; isolating said suspended solids; releasing, from the mixture, said water and said hydrocarbons in discrete phases; collecting on a movable collection surface, said hydrocarbons; discharging the collected hydrocarbons; filtering said water progressively in a plurality of individual stages; and discharging the filtered water.

The present invention, can be applied as an alternative preliminary treatment which enables effective utilization of reverse osmosis membranes. For example, the present invention can extract suspended solids of a size greater than 1 micron. It can extract or significantly reduce the level of selected other contaminants. In another example, the present invention extracts more than 99.8% of hydrocarbons from a fluid stream. Those hydrocarbons are recovered in valuable, marketable condition satisfying applicable industry specifications for pipeline shipment and storage.

In yet a further embodiment of the present invention, there is provided a system for continuous extraction and recovery of hydrocarbons from a wastewater source comprising hydrocarbons and water, comprising means for inducing separation of hydrocarbons from water in said wastewater; a plurality of vertically aligned weir panels disposed in said wastewater to coalesce and migrate said hydrocarbons to a layer above said water in said wastewater; a movable collection surface for skimming hydrocarbons from said water, a first collector for collecting said hydrocarbons from said surface; a filtration array for filtering said water; and a second collector for collecting said filtered water.

In a particularly preferred embodiment, the system further comprises an exhaust module for discharge by atomization and evaporation of said filtered water to the atmosphere.

For example, the present invention may be a system that can be rendered in a robust, portable configuration designed for reliable operation at remote locations. The throughput capacity of the system can be increased by using more powerful pumps without a proportionate increase in size. This allows the system of the present invention to retain a portable format at significantly increased capacity.

Operating costs may be reduced as a result of automation and remote monitoring of the present invention, which requires less skilled operations personnel at remote sites, no backwash fluid waste disposal services, no supply of hazardous cleaning chemicals, and incorporates reusable stainless steel filter elements with ultrasonic agitation cleaning, which minimizes dependencies on consumable items to a disposable scavenger filter.

In another embodiment, the present invention can be applied as an alternative surface wastewater treatment system. Valuable hydrocarbons associated with hydrocarbon based drilling mud can be recovered and reused on site. Treated water can be reused on site in industrial processes reducing the need to source and transport fresh water to remote locations.

In still a further aspect of the present invention, treated water may be discharged to the environment in an environmentally sustainable manner. For example, the treated water may be discharged to the ground, a water body such as a river, lake or ocean, or discharged by atomization and evaporation directly to the atmosphere. Discharging the treated water to the environment via any of these methods, reduces the large fuel consumption that is typically utilized by a conventional crude evaporation boiler. This reduces both direct costs for fuel and indirect costs for transportation of that fuel to remote locations or offshore drilling platforms. In addition, instead of evaporating associated contaminants together with the water, the present invention treats the water to applicable environmental standards before discharging it to the atmosphere.

One object of one embodiment of the present invention is to provide an improved process for hydrocarbon extraction.

The improvements in the method and apparatus are realized in one aspect in the selection of a self priming positive displacement suction pump which enables self contained capability to intake fluids from a passive reservoir of wastewater. Determination of the intake pump flow rating capacity and flow control maximizes the processing capacity of the entire system which depends on sufficient wastewater intake flow.

Further, the technology discussed herein takes advantage of the surface area and power rating of a mineral coated submerged electric thermal heating element to deliver sufficient thermal energy to the intake stream of wastewater to break the bonding between emulsions of water and hydrocarbons and detach those hydrocarbons in preparation for separation, coalescence and migration to the surface.

The shape and placement of a heating element used in the system maximizes the thermal surface area exposed to the intake stream of wastewater.

The structure of a containment shroud around the heating element maximizes the duration of exposure of the intake stream of wastewater to contact, or be in close proximity with, the heating element. As a further advantage to the system, determination of the volume, air pressure and size of bubbles injected into the wastewater maximizes the separation of hydrocarbons.

The structure and arrangement of the array of weir panels maximizes hydrocarbon separation, coalescence and migration to the surface. To complement this, the structure of the water diversion weir panel effectively circulates water to the bottom of a skimming tank and maintains the segregation of that water for transfer to the filtration stage.

The sequential procedure of draining clear fluids consists of draining fluid through the sidewall outlet, detecting the fluid level indicating completion of that preliminary step, opening the bottom outlet drains, then purging turbid fluids and settled solids separately through those drains. This procedure enhances complete filtration of the large volume of clear fluids by separating and delaying filtration of a smaller volume of turbid fluid containing a high concentration of settled solids which avoids premature plugging of filter elements and reduction of processing throughput.

The selection of a highly ionic charged material with specific oleophilic properties for the surface of the rotating drum maximizes hydrocarbon extraction.

The arrangement of the size, placement, and depth of immersion of the movable collection surface, in this case, an oleophilic drum and the orientation of an associated skimming wiper, maximizes hydrocarbon extraction and recovery.

The control of the rotational direction, intermittent or continuous operation and variable speed of the oleophilic drum maximizes hydrocarbon extraction and recovery under various conditions.

The arrangement of the hydrocarbon wiper funnel and conduit pass vertically through the interior of the skimming tank. This conserves space, minimizes plumbing fixtures, promotes the gravity flow of hydrocarbons and delivers hydrocarbons directly to the lowest point of the sloped bottom of the recovery tank.

Hydrocarbons recovered are segregated into a tank of specified volume with a level sensor that triggers the periodic discharge of all hydrocarbons in that tank, accompanied by electronic tracking of the number of discharge cycles.

The structure of the recovery tank has a sloped bottom to promote complete and rapid drainage of the full volume of hydrocarbons.

This integrated volumetric discharge technique offers a primary means of measurement, or a supplemental means of validating, the amounts of hydrocarbons recovered. It provides an alternative to depending on remote external metering of a continuous discharge stream of hydrocarbons, the results of which may be subject to meter calibration, tampering and reliability concerns.

A metering sensor is used to monitor and adjust water flow throughout the system to maximize processing capacity and avoid imbalances in flow rates, pressures and holding tank reservoir capacities. Conveniently, a self priming positive displacement pump with a specified rating is used to ensure constant throughput and maintain adequate water flow to maximize processing capacity.

The arrangement of filter material, referred to in this document as pods, in a sequential array enables progressive filtering of solids by passing the stream of water through progressively finer particle filter elements and the filtering of contaminants by passing the stream of water through a scavenger filter element.

The selection of a material with specific adsorptive properties for the scavenger filter element maximizes the filtration of fine solids and contaminants.

The arrangement of an array of standard size filter pods enables flexibility in selecting the desired sequence of filtration based on the volume and size of solids and contaminants present in the wastewater. For example, the filter elements inserted in a sequence of, for example, three filter pods could be a 40 micron particle filter, a 1 micron particle filter and a scavenger filter, or all filter pods could have scavenger filter elements inserted.

The arrangement of each array of filter pods in staggered tiers enables direct structural connections between the offset inlet flange and outlet flange of each filter pod in sequence. This eliminates reliability issues associated with flexible hoses and connectors, promotes effective drainage and conserves space.

Multiple banks of filter arrays with associated flow pressure sensors enables detection of plugged filter elements, and automatic switching of the water flow to an alternate filtration array. This enables uninterrupted operation during the periodic cleaning and replacement of filter elements. This differs from alternate processes that use a backflush procedure to purge trapped solids, which interrupts filtration operations, reduces processing capacity, requires additional pumps and equipment and generates additional volumes of waste fluids for disposal.

Each filter pod includes a pressure relief valve. This enables complete and rapid purging of the filtration array during operations, filter element replacement, maintenance and shutdown by avoiding the creation of an internal vacuum within the filter pods.

The use of reusable stainless steel filter elements minimizes operational dependency on the availability of consumable supplies and reduces the environmental impact of disposable filter elements. Integration of an ultrasonic agitation cleaning system enables the use of reusable filter elements, enables continuous filtration operations and the capture and disposal of solids trapped during filtration. This differs from alternative processes such as high pressure water cleaning which results in abrasion reducing the useful life of reusable filter elements, and generates additional volumes of waste fluids for disposal.

The use of a matrix of control valves allows the option of directing water in real time, for either re-use or environmentally sustainable discharge, or dividing the stream of water proportionately between those options.

An organic scaling prevention treatment reduces the formation of mineral deposits which would otherwise impair heat transfer and diminish the lifecycle of the heater components.

The water tank includes level sensors and controls which turn off the heating element if the volume of water falls below a specified threshold. Upon shutdown the controlled circulation of water produces a gradual cool down of the heater and associated elements. This prolongs the lifecycle of the heater and reduces thermal stress and cracking of associated elements of the system.

The selection of a type of transfer pump which maintains a constant flow despite fluctuations in backpressure is necessary to manage the flow control required to achieve the characteristics needed for effective atomization of water upon discharge at the exhaust orifice.

The heater has been modified by adding dual temperature sensors which detect the surface temperature of the heating element and the temperature of the water separately. This provides more precise control of temperature parameters and protects the heating element from being overloaded.

The process of combined temperature, pressure and flow control is required to achieve the characteristics needed to accomplish atomization of the water upon discharge to ambient temperature and pressure.

The structure of the exhaust tube includes an internal central outlet combined with a surrounding return channel connected to an inverted cone at the exhaust orifice. This enables two way flow of water to be discharged for atomization and condensation captured for circulation back to the holding tank. During cold weather operation the return surrounding the exhaust outlet provides a measure of insulation.

The nature of the exhaust orifice produces a rapid drop in water temperature and pressure which results in an enhanced atomization discharge effect. This substantially reduces heating requirements and increases fuel efficiency compared with alternative thermal evaporation boiler techniques. The selection of the size and shape of the exhaust orifice and automated control of flow and heater temperature enables control of pressure and temperature to optimize vaporization upon release to the atmosphere at varying differences in temperature and pressure between the internal vessel and the outside atmosphere. A pump that maintains prescribed volume and pressure, despite fluctuations in temperature, transfers water to an inline heater. As the heater increases temperature, the pressure increases, requiring detection by pressure, temperature and flow sensors and automated controls to adjust and maintain the desired pressure, temperature and throughput volume to optimize effective atomized discharge. The inverted cone on the end of the exhaust tube captures released water droplets that have not fully vaporized and returns them to the input to the heater through the hollow channel around the outside of the exhaust tube.

The direction of water for re-use provides an alternative to discharge or disposal of wastewater. This reduces requirements for fresh water intake by industrial processes.

Constant or periodic application of auxiliary processes including reverse osmosis membranes, an enhanced orifice discharge technique, and other known treatment techniques, is proposed as a means for segregating and eliminating contaminants from the water, including without limitation dissolved solids and salts. This further extends the life cycle of process water, reduces waste discharge streams and further reduces requirements for fresh water intake by industrial processes.

The arrangement of automation elements required for coordinated monitoring and control of the processes and procedures reduces opportunities for human error and minimizes requirements for skilled human operation resources on-site. As a consequence it enhances operational reliability, avoids repairs and maintenance, maximizes processing capacity, and maximizes operating cost efficiencies at remote locations.

Computer software program instructions implement the logic governing the monitoring and control of the processes and procedures involved in the method.

The system also integrates a telecommunications system which enables remote data transfer and digital communication for implementing the method, operational management, diagnostic fault analysis, maintenance and repair.

The features of the invention will become more apparent in the following detailed description in which reference is made to the appended drawings.

BRIEF DESCRIPTION OF THE DRAWINGS

The foregoing and other advantages of the present invention may become apparent upon reviewing the following detailed description and drawings of non-limiting examples and embodiments in which:

FIGS. 4 and 4A are isolated perspective views of the skimmer unit for use with the present invention.

Similar numerals employed for the drawings denote similar elements

DETAILED DESCRIPTION OF THE PREFERRED EMBODIMENTS

Figure 1:
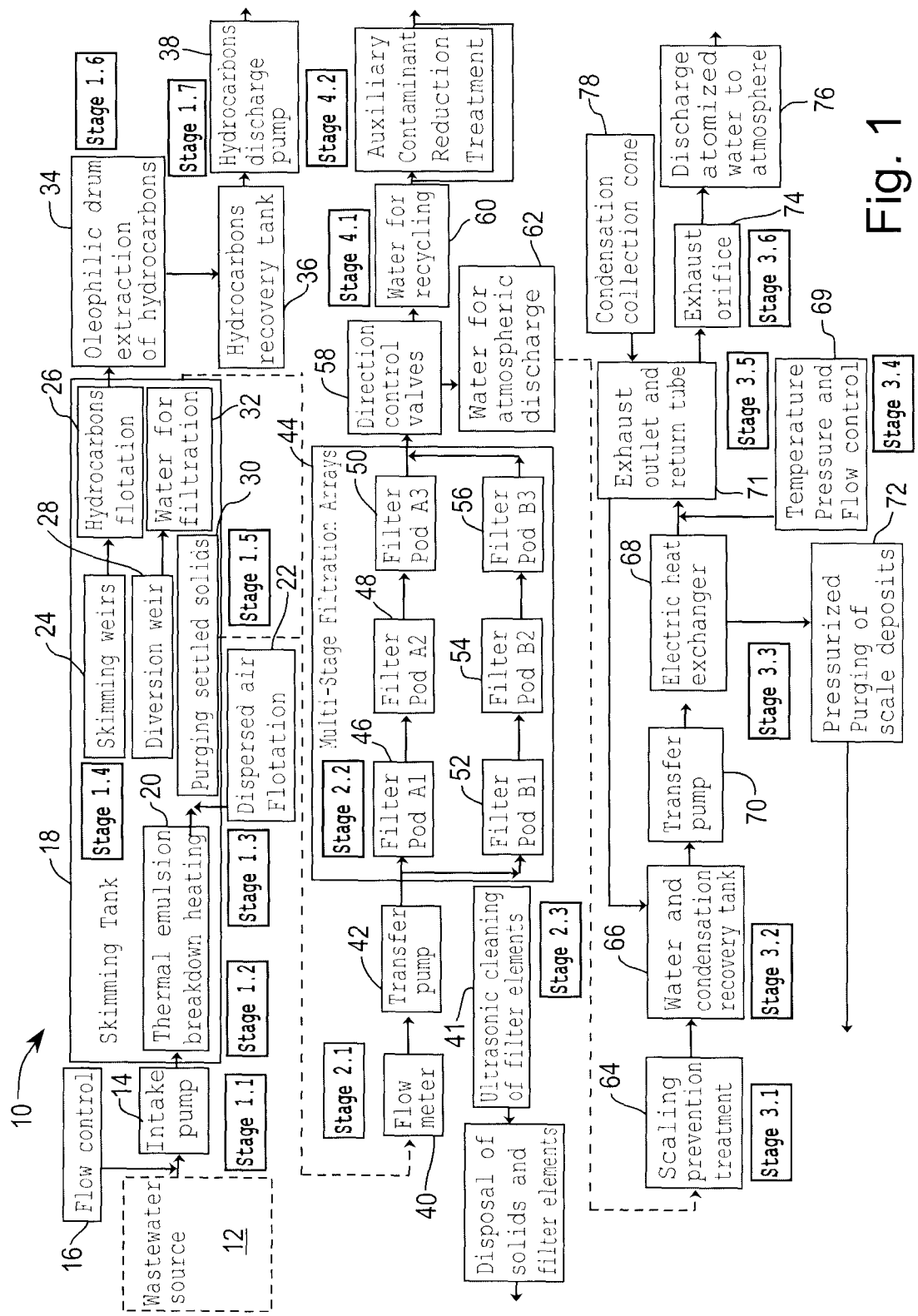
FIG. 1 is a flow diagram of the process steps involved in the methodology.

Referring now to the drawings, FIG. 1 shows a schematic of the overall process denoted by numeral 10.

During the separation and recovery stage of processing, water combined with hydrocarbons, suspended solids, and contaminants, referred to in this document as wastewater is processed to separate, extract and recover hydrocarbons in measured quantities, purge any settled suspended solids and segregate the remaining fluid for filtration processing. Contaminants include but are not limited to, naturally occurring compounds, synthetic additives and dissolved solids and comprise suspended mineral salts, dissolved chlorides, naturally occurring radioactive materials, ("NORMs"), ions, chemicals and other substances.

Referring to FIG. 1, an external source of wastewater, 12, is in fluid communication with a self priming positive displacement suction pump 14 to produce an intake stream of wastewater. Intake flow is controlled by flow control device 16 based on processing and capacity parameters.

As the wastewater is transferred into a skimming tank, generally denoted by numeral 18, the intake stream of wastewater passes in close proximity to a heating element 20 to breakdown emulsions of water and hydrocarbons which are present.

As an alternative, the emulsions may be broken by agitation, chemical additives or a combination of these and heat.

A dispersed air or induced gas, flotation generator associated with the skimming tank 18, generally denoted by numeral 22, injects air or non-reactive gas bubbles into the wastewater to enhance the rapid and complete phase separation and migration of hydrocarbons into a layer flowing on the surface of the skimming tank 18 to have discrete phases. Examples of suitable non-reactive gases include for example, carbon dioxide and ozone.

In the skimming tank 18, the wastewater flows through coalescing elements shown as multiple vertically aligned weir panels 24 in FIG. 4A, of progressively increasing length, submerged below the surface and extending to progressively increasing depth. The weir panels 24 divert the flow of wastewater to increasing depths, exposing the hydrocarbons to increased hydrostatic pressure. The hydrocarbons separate from the remaining wastewater, collect on the weir panels 24, amalgamate through coalescence and migrate to the surface of the skimming tank 18.

Separated hydrocarbons form a layer floating on the surface of the skimming tank 18. A portion of the solids suspended in the wastewater settle to the bottom of the skimming tank 18. The remaining water is diverted toward the bottom of the skimming tank 18. An additional diversion weir panel (not shown) prevents water from rising to the surface and channels the flow of water from the bottom of the tank 18 to a primary outlet O located on the sidewall of the skimming tank 18. The diversion weir 28 circulates water to the bottom of the skimming tank 18 for transfer to a collector tank 32 for the filtration stage 44.

Settled solids and fluids are periodically discharged from the skimming tank 18 during purging cycles as denoted by numeral 30. During purging, fluid is initially discharged from the sidewall outlet O. A sensor (not shown) detects when the level of fluid in the skimming tank 18 falls below the level of that sidewall outlet O. Upon activation of that sensor, outlet drains (not shown) located at the bottom of the tank are opened, purging the settled solids and remaining fluids for filtration.

A movable collection surface, generally denoted by numeral 34, and shown in the example as a rotating drum with a surface is positioned at the top of the skimming tank 18 and is adapted to be partially immersed in the fluid. As is well known, hydrocarbons adhere to materials which have oleophilic properties. In one embodiment, the surface is composed of an oleophilic material. The drum 34 rotates in a direction which causes the surface flotation layer of hydrocarbons to adhere to the rotating drum 34 and be extracted upward from the surface of the fluid. An associated wiper blade (not shown) skims the rotating drum 34 and deflects the extracted hydrocarbons into a funnel (not shown) with an outlet channel (not shown) connected to a recovery tank 36. Other mechanical means may be used to deflect and collect the hydrocarbons.

In an alternative embodiment, the surface of the movable collection surface 34 may comprise mechanical skimming elements such as rubber or metal discs or brushes that skim the hydrocarbons, especially in cases where the hydrocarbon layer is particularly viscous.

Recovered hydrocarbons are temporarily segregated into the recovery tank 36 with a specified volume capacity. A sensor (not shown) monitors the level of hydrocarbons and determines when the recovery tank 36 is full. Upon activation of that sensor the recovery tank 36 is completely emptied by a discharge pump 38, which results in the discharge of that specified volume of recovered hydrocarbons into an external storage vessel (not shown). The number of discharge cycles is automatically recorded.

A flow meter 40 and pump 42, an example of which is a self priming positive displacement suction pump are applied to measure and transfer a stream of water through the skimming tank 18 sidewall outlet to the filtration stage, globally denoted by numeral 44.

Filtration is undertaken by passing water through an array of multiple, directly connected filter pod housings 46 through 56. Each filter pod housing in the array is configured to contain multiple filter elements (not shown). The filter elements inserted in any particular pod housing array may all be a similar or different type and filtration size rating, For example particle filter elements may be used and are reusable stainless steel absolute filters ranging in size between 40 microns and 1 micron. Fine particle, hydrocarbon and contaminant scavenger filter elements may also be used and are a specialized composition of disposable adsorptive material. As a further example, ultrafiltration filter elements may also be used in a filter element and include ceramic membranes with an integrated backwash flush cleaning system.

Depending on the nature of solids and contamination contained in the wastewater, different combinations of filtering sequences may be used. The filtration sequence captures solids of progressively reduced size together with contaminants. For example, a typical filtration sequence may be composed of a primary pod containing 40 micron particle filter elements, a secondary pod containing 1 micron particle filter elements, and a final pod containing scavenger filter elements.

Filtration arrays are arranged in multiple redundant banks either serially or in parallel to provide for continuous flow and filtration operation during the cleaning, maintenance and replacement procedures for any particular array of filter pods. Pressure differential sensors (not shown) in the filter pod housing detect plugged filter elements, shutoff the flow to that filtration array and divert the flow to another filtration array to enable the performance of filter element cleaning, maintenance and replacement.

An ultrasonic agitation filter element cleaning system 41 may be associated with the filtration stage 44 to enable the performance of periodic cleaning and reuse of reusable filter elements in the pods 46 through 56 and the capture and disposal of filtered solids at 43. Scavenger filter elements are disposable after use.

Following filtration, an array of control valves 58 direct the water for re-use 60, or for environmental discharge, for example atmospheric discharge 62, or divides it proportionately between re-use and atmospheric discharge. Re-use of filtered water could be for a range of industrial purposes, such as in hydrocarbon extraction operations or as gray water.

Figure 6:
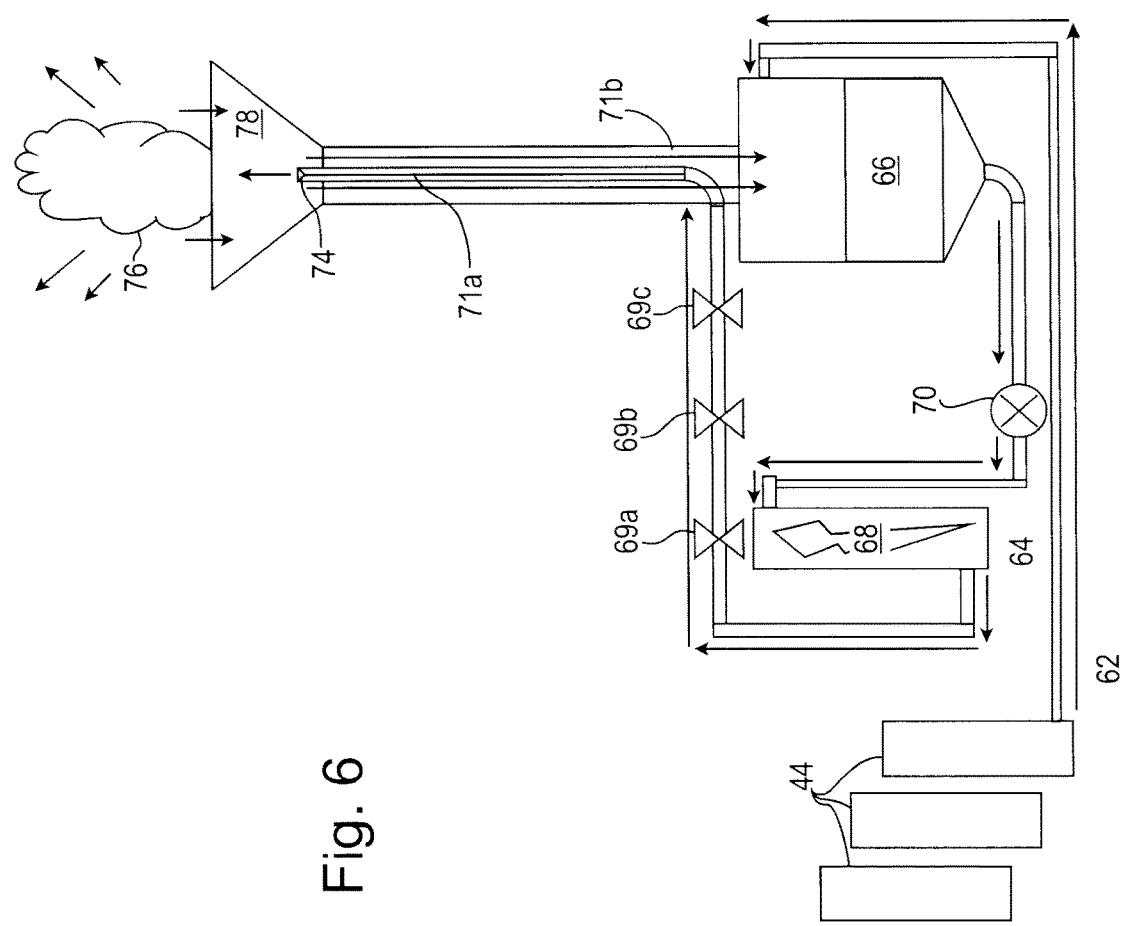
FIG. 6 is a diagram of the process steps involved in atomized discharge of water to the atmosphere through an exhaust tube and orifice.

Accordingly, in one embodiment, the present invention may comprise an exhaust module for discharge by atomizing the filtered water and evaporating it to the atmosphere and shown in detail in FIG. 6. An organic coating substance is introduced into water directed for atmospheric discharge, to prevent the formation of scale and mineral deposits, shown as operation 64 on the surface of heating elements. Upon contact with the heating elements, the substance forms a coating which has an acidity level that inhibits the formation of scale and also acts as a barrier blocking direct adhesion of scale.

Following the scaling prevention treatment 64 the stream of water is transferred into water and condensation recovery tank 66 for discharge to the atmosphere. As seen in both FIG. 1 and FIG. 6, from tank 66 the water is transferred to a heater 68 by a transfer pump 70, an example of which is a positive displacement hydraulic cell pump, capable of maintaining a constant volume flow independent of fluctuations in back pressure.

The stream of water is introduced into a heater 68 with an associated mineral coated electrical element. The water is heated to controlled temperature and pressure. Periodically the contents of the heater 68 are purged under pressure to remove scale deposits. This operation is denoted by numeral 72.

The pump 70 maintains prescribed volume and pressure, despite fluctuations in temperature, as it transfers water to the heater 68. The heater outlet is monitored by temperature, pressure and flow sensors, and controls, globally denoted by numeral 69 in FIG. 1 and 69a, 69b, and 69c respectively in FIG. 6, which maintain specified discharge, temperature and pressure characteristics, and throughput volume to optimize effective discharge of atomized water 76.

The heater outlet is connected to the external atmosphere through a vertical exhaust tube and an exhaust orifice, referenced by numerals 71 and 74 in FIG. 1. The length of the removable exhaust tube is variable, depending on the height and orientation of the exhaust plume needed to accomplish the desired atmospheric dispersion.

Referring to FIG. 6, the exhaust tube 71 is comprised of an inner exhaust outlet 71*a* separated from a surrounding condensation return channel 71*b*. An inverted condensation collection cone 78 attached to the exterior end of exhaust outlet 71*a* at the exhaust orifice 74 collects condensation and water and circulates it back through the condensation return channel 71*b* to the water and condensation recovery tank 66.

The size, shape and nature of the exhaust orifice 74 produces a combination of atomization, vaporization and evaporation effects as a result of the controlled heating, pressurization and flow of water followed by a rapid change to ambient temperature and pressure though the exhaust orifice.

Following filtration, as an alternative to discharging the water, the stream of water may be re-used in industrial processes.

Eventually, continuously re-used process water will become saturated with escalating levels of suspended solids or contaminants including dissolved solids contributed by upstream industrial processes. Based on a determination of the nature of the suspended solids and contaminants and saturation levels concerned, auxiliary processing techniques may be combined to supplement the method.

These auxiliary processes may include enhanced orifice discharge segregation techniques or other known techniques including without limitation, ceramic plate techniques and reverse osmosis membrane techniques, either in combination, or independently. Through constant or periodic, application of auxiliary contaminant reduction treatment, water which inherently contains, or eventually accumulates, unacceptable contaminant saturation levels can be conditioned to a reusable state. The auxiliary processes selected will depend on the specific content of the process water. Other unit operations useful for auxiliary processing include the use of activated alumina, activated carbon, aeration, anion exchange, precipitation, chlorination, distillation, mechanical filtration, oxidizing filters, reverse osmosis membranes, ultraviolet exposure, inter alia.

The operating parameters of the processes and procedures comprising the method, including without limitation, temperature, pressure, flow rates, volume, status and other characteristics are monitored and controlled by a configuration of elements including a programmable logic controller, touch screen display, sensors, drives, keypads, indicators, switches, data storage devices, telecommunications devices and technology systems.

It will be appreciated by those skilled that the entire process can be logically controlled for precise execution of all unit operations.

Of particular benefit is the fact that the method offers scalable processing capacity. Systems implementing the method may be fabricated in a portable configuration or as a fixed plant installation with a larger processing capacity. The elements of such systems are scalable to accommodate increased capacity. For equipment components which are only available in a limited size, arrays of multiple components can accommodate increased capacity.

Figure 2:
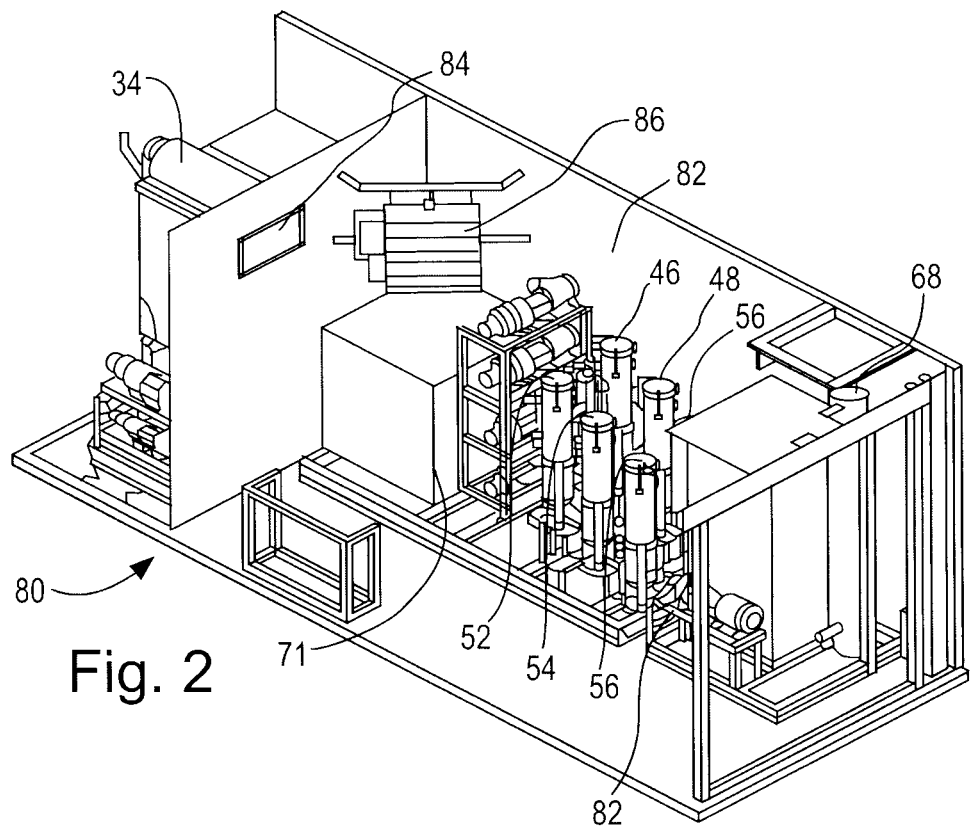
FIG. 2 is a partially cut away perspective view of one embodiment of the apparatus of the present invention.
Figure 3:
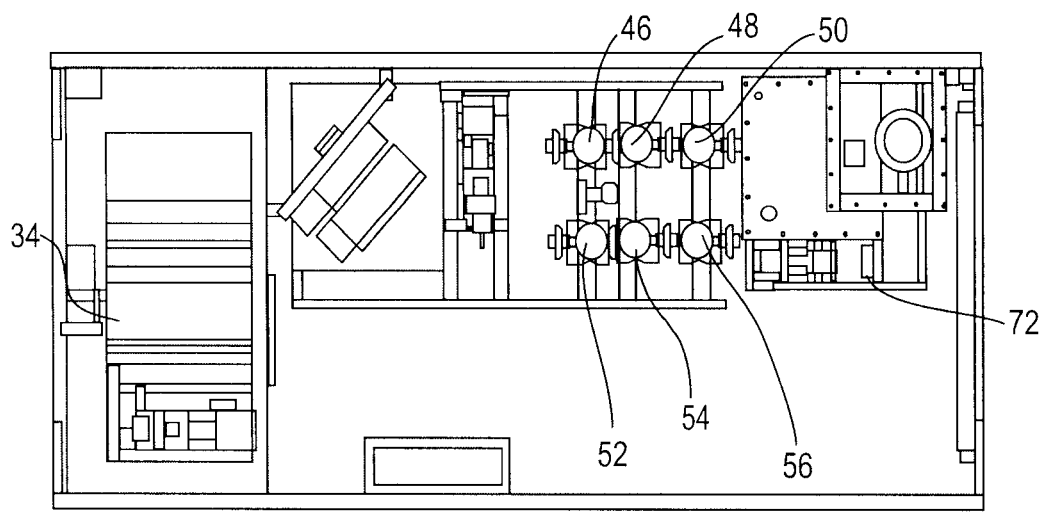
FIG. 3 is a top plan view of FIG. 2.

Referring now to FIG. 2, shown is an example of portable apparatus of the configuration. The apparatus is generally denoted by numeral 80. The container 82 housing the components is an explosion proof material with an internal observation window 84 from the heated filtration and discharge process enclosure which is heated with heater 86 and accessible by human operators. Additionally, the arrangement of the elements of the complete system are organized to fit within a standard size transport container and to maximize processing capacity within that limited space. FIG. 3 illustrates the arrangement in plan view. The remaining internal components have been discussed in connection with FIG. 1.

Figure 5:
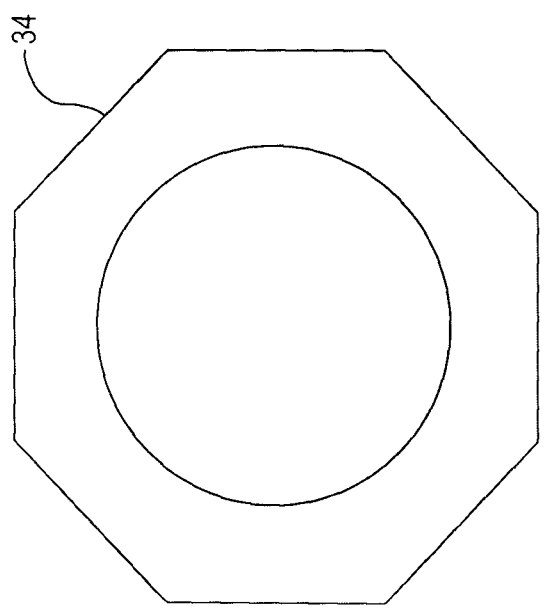
FIG. 5 is a schematic illustration of an alternate embodiment.

FIG. 4 illustrates a first embodiment of the skimmer tank 18 referred to in this document. As is illustrated, the skimmer tank 18 provides the movable collection surface 34 for collecting the hydrocarbons as established earlier. The surface is illustrated as drum, however, the surface could easily be any suitable configuration, such as a track or a polygonal arrangement as is illustrated in FIG. 5. Other suitable high surface area arrangements will be readily apparent to those skilled in the art.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

We claim:

1. A method for treating wastewater for industrial reuse or environmentally permitted discharge, comprising:
    receiving, at a portable unit, a source of wastewater comprising hydrocarbons, water, suspended solids and contaminants;
    treating said source of wastewater to separate said hydrocarbons from said wastewater;
    isolating said suspended solids from the treated wastewater;
    releasing, from the treated wastewater, said water and said hydrocarbons in discrete phases;
    in a first discrete phase, collecting said hydrocarbons on a movable oleophilic collection surface extending across a skimming tank and being partially submerged in a fluid containing said hydrocarbons, the movable collection surface being positioned at an upper portion of said skimming tank for causing the hydrocarbons to be deposited on the oleophilic surface;
    discharging the collected hydrocarbons;
    in a second discrete phase, filtering said water progressively in a plurality of flow channels, each flow channel comprising a plurality of individual stages each stage having a reusable filter element; and
    discharging at least a portion of the filtered water by atomizing the portion of the filtered water and releasing an atomized mist to the atmosphere.

2. The method of claim 1, wherein said discharging of said filtered water is to an environment.

3. The method of claim 2, further comprising conditioning said filtered water with a combination of heat, pressure and flow control prior to atmospheric discharge to said environment.

4. The method of claim 1 wherein each stage in said filtering of said water comprises a distinct filter pore size relative to another stage.

5. The method of claim 1, wherein each stage comprises a different filtration medium relative to another stage.

6. The method of claim 1, comprising reusing another portion of said filtered water.

7. The method of claim 6, comprising treating the filtered water with an auxiliary treatment operation to remove said contaminants.

8. The method of claim 7, wherein said contaminants comprise at least one of dissolved solids and salts.

9. The method of claim 1, wherein said treating comprises breaking any emulsions present in said water.

10. The method of claim 9, wherein said emulsion breaking is effected using at least one of heat, agitation and chemical additives.

11. The method of claim 1, wherein said treating comprises injecting at least one of dispersed air and non-reactive gas into said mixture to induce separation and migration of hydrocarbons into a discrete layer above said water in said wastewater.

12. The method of claim 1, wherein said treating further comprises exposing said wastewater to progressively increased hydrostatic pressure for hydrocarbon separation.

13. The method of claim 12, wherein said treating further comprises exposing said wastewater to a coalescing element to coalesce said hydrocarbons on a surface of said element.

14. The method of claim 13, wherein said coalescing element comprises a plurality of vertically aligned weir panels submerged in said wastewater, said weir panels being of progressively increasing length respective to one another.

15. The method of claim 1, further comprising discharging said isolated suspended solids.

16. The method of claim 1, wherein said moveable oleophilic collection surface further comprises a skimming element.

17. The method of claim 1, wherein the oleophic collection surface and the skimming tank are located within a segregated area within the portable unit.

18. The method of claim 17, wherein the segregated area is explosion proof.

19. The method of claim 1, further comprising cleaning the reusable filter elements.

20. The method of claim 18, wherein the reusable filter elements are cleaned using ultrasonic cleaning equipment.

21. The method of claim 1, wherein the portable unit is sized to fit within a transport container.

22. A portable unit for treating wastewater for industrial reuse or environmentally permitted discharge, the portable unit comprising:

an intake for receiving a source of wastewater comprising hydrocarbons, water, suspended solids and contaminants;

a treatment module for treating said source of wastewater to separate said hydrocarbons from said wastewater;

apparatus for isolating said suspended solids from the treated wastewater, and for releasing, from the treated wastewater, said water and said hydrocarbons in discrete phases;

a first discrete phase module for: i) collecting said hydrocarbons on a movable oleophilic collection surface extending across a skimming tank and being partially submerged in a fluid containing said hydrocarbons, the movable collection surface being positioned at an upper portion of said skimming tank for causing the hydrocarbons to be deposited on the oleophilic surface, and ii) discharging the collected hydrocarbons;

a second discrete phase module for filtering said water progressively in a plurality of flow channels, each flow channel comprising a plurality of individual stages each stage having a reusable filter element; and a discharge apparatus for discharging at least a portion of the filtered water by atomizing the portion of the filtered water and releasing an atomized mist to the atmosphere.

* * * *